Dec. 5, 1961 P. J. LACHAT 3,011,735
FISHING LINE STORAGE SPOOL ASSEMBLY
Filed Feb. 14, 1958 2 Sheets-Sheet 2

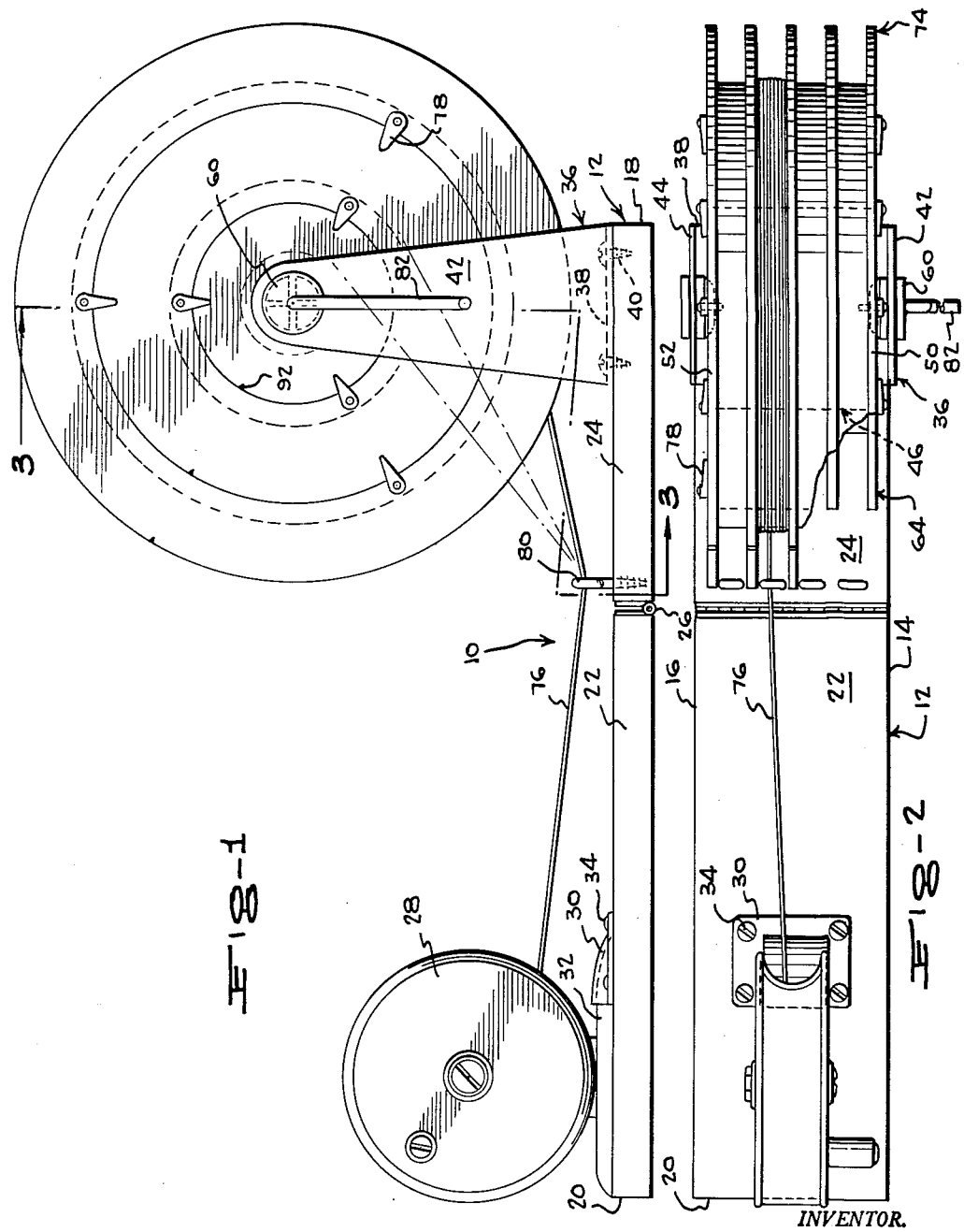

INVENTOR.
PAUL J. LACHAT
BY
McMorrow, Berman & Davidson
ATTORNEYS

United States Patent Office 3,011,735
Patented Dec. 5, 1961

3,011,735
FISHING LINE STORAGE SPOOL ASSEMBLY
Paul J. Lachat, 228 Holabird Ave., Winsted, Conn.
Filed Feb. 14, 1958, Ser. No. 715,418
2 Claims. (Cl. 242—118.4)

The present invention relates to a storage spool assembly for fishing lines.

An object of the present invention is to provide a storage spool assembly for fishing lines which lends itself to ready portability and to use as a means for storing a plurality of fishing lines of various weights and sizes with the same readily accessible for winding upon a fishing reel when wanted.

Another object of the present invention is to provide a storage spool assembly for fishing lines which is neat and attractive in appearance, one sturdy in construction, one simple in structure and economical to manufacture and assemble, and one which is highly effective in action.

These and other objects and advantages of the present invention will be fully apparent from the following description when taken in connection with the annexed drawings, in which:

FIGURE 1 is a side elevational view of the assembly of the present invention;

FIGURE 2 is a plan view of the assembly shown in FIGURE 1;

Figure 4:
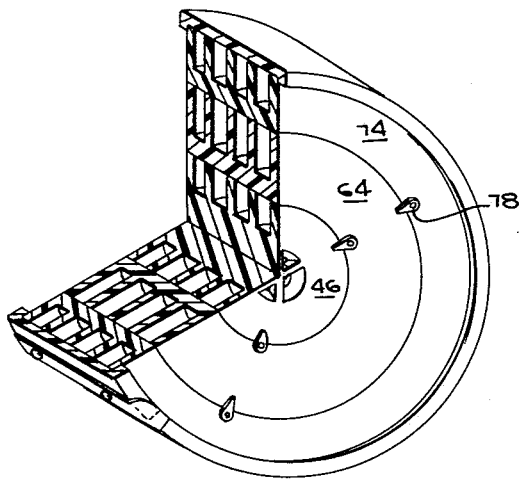
FIGURE 4 is an isometric view of the three reel spools of the assembly with a portion of each spool broken away.

Referring in greater detail to the drawings in which like numerals indicate like parts throughout the several views, the fishing reel storage spool assembly is designated generally by the reference numeral 10 and comprises an elongated base 12 having a forward side edge 14, a rearward side edge 16, an end edge 18 extending between one of the adjacent ends of the forward and rearward side edges and another end edge 20 extending between the other of the adjacent ends of the forward and rearward side edges.

The base 12 is fabricated of two pieces laid in end to end relation, the pieces being designated by the reference numerals 22 and 24 and being connected together substantially at a midpoint by a hinge member 26.

Means is provided on the base 12 for attachment thereto of a fishing reel 28, such means consisting in a plate member 30 having a central raised portion conformably shaped to fit the end portion of the reel support foot 32 commonly used to attach the reel 28 to a fishing pole. Although the plate 30 is shown attached to the base 12 by means of screws 34 it may also be demountably secured to the base 12 and slidably positioned within a groove provided in the upper face of the base 12 if desired. This would permit folding of the two pieces of the base 12 one upon the other to reduce the size of the base 12 and permit it to be placed in an upstanding position upon a support for storage.

An upstanding U-shaped support member 36 has its bight 38 fixed by screws 40 to the base 12. The legs of the support member 36 constitute standards 42 and 44 rising from the base 12 in transversely aligned spaced relation with the standard 42 adjacent the forward side edge 14 of the base 12 and the standard 44 adjacent the rearward side edge 16 of the base 12, the standards being adjacent the end edge 18 of the base 12.

A first reel spool 46 having a core 48 and flanges 50 and 52 extending about the core 48 at each end thereof is positioned between the standards 42 and 44 so that the flange 50 faces the standard 42 and the flange 52 faces the standard 44 with the midportion of the core 48 between and rotatably supported in the upper ends of the standards 42 and 44.

Figure 5:
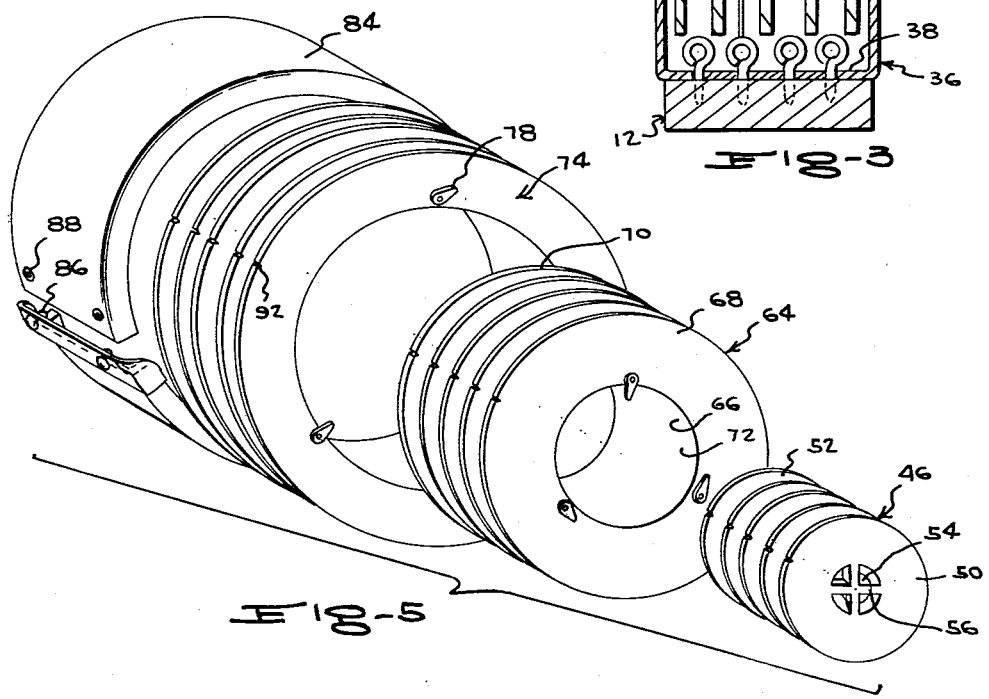
FIGURE 5 is an isometric exploded view of the reels and cover of the assembly according to the present invention.

The core 48 of the reel spool 46 is provided with an axially disposed recess at each end thereof, one of such recesses being shown in FIGURE 5 and designated by the reference numeral 54. Radially arranged ribs 56 bisect the recess 54 on each end of the spool 46 and has their outer faces coplanar with the face of the adjacent flange 50 or 52.

Figure 3:
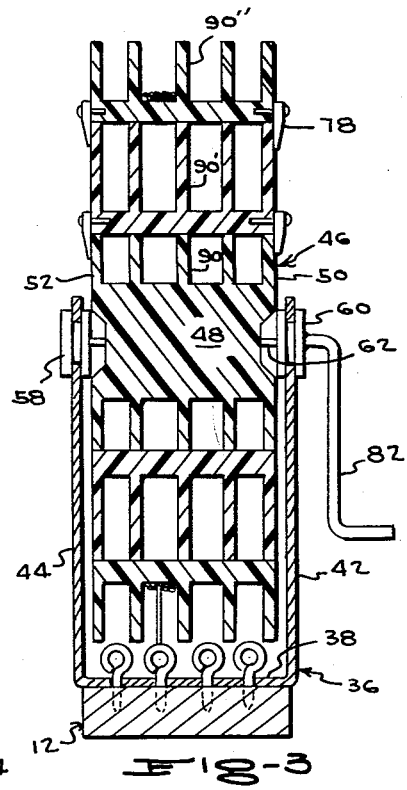
FIGURE 3 is a sectional view taken on the line 3—3 of FIGURE 1.

The means supporting the spool 46 for rotation in the standards 42 and 44 consist in a rotatable plug element 58 receivable within the recess 54 adjacent the flange 52 and another plug element 60 receivable within the recess 54 adjacent the flange 50. The plug elements 58 and 60 have complementally arranged slots or grooves receiving the ribs 56 for detachably securing the plug element to the adjacent end of the core 48. One such slot is shown in FIGURE 3 and designated by the reference numeral 62. The plug elements 58 and 60 are loosely supported in the upper end portions of the standards 42 and 44, in holes provided for the plug elements. Preferably, they are formed in two parts and cemented together after assembly within the associated standard hole.

A second reel spool 64 is circumposed about the first reel spool 46, the spool 64 having a core 66 and flanges 68 and 70 extending about the core 66 at each end thereof with an opening 72 extending axially from one end to the other end of the core 66. The opening 72 is of a size to conformably receive and fit about the perimeters of the flanges 50 and 52 of the reel spool 46.

When the spool 64 is positioned so that the opening 72 receives the flanges 50 and 52 of the reel spool 46, the flanges 50 and 52 and the flanges 68 and 70 are coplanar and flush with each other.

A third reel spool 74 is circumposed about the second reel spool 64, the spool 74 being provided with an opening conformably shaped to fit the flanges of the spool 64 and is detachably secured thereto when it is desired to wind or unwind a length of fishing line thereon or therefrom, such fishing line being shown in FIGURE 1 and designated by the reference numeral 76. The position of the fishing reel 28 is such that it is rotatable about a horizontal axis and is in cooperative relation with respect to the outermost reel spool 74 when the latter is supported on the reel 64, or with the spool 64 when the latter is supported upon the reel spool 46, or in cooperative relation with respect to the first reel spool 46 when the spools 64 and 74 are removed from their position supported upon the spool 46.

A plurality of spaced latching elements are carried by the flanges of the second and third reel spools 64 and 74 and each is swingable about a horizontal axis into engagement with the flanges of the adjacent reel spools 46 and 64, respectively. The latching elements 78 constitute only a single means by which the reel spool 74 may be attached to the spool 64 and the spool 64 attached to the spool 46.

A plurality of screw eyes 80 are positioned in a row between the standards 42 and 44 in the reel 28 and serve as guides for the fishing line 76 as it is wound upon one of the reel spools for the purpose of storage.

Hand actuable means is provided operatively connected to the core 48 of the reel spool 46 for effecting the rotation of the reel spool 46. This means consists in a crank 82 having one end fixedly secured to the plug element 60 and having the other end accessible to the hand of the user for turning of the assembled reels.

A detachable cover 84 may be used if desired to cover the storage spool assembly, it being of the split ring type and having fastening elements 86 and 88 on its free end cooperative with each other to hold the cover 84 in a position about the perimeter of the reel spool 74. Each of the reel spools is provided with a plurality of partitions 90, 90' and 90" which subdivide the respective reel spool into a plurality of compartments for the receipt thereon of a coil of fishing line.

In use, the storage spool assembly of the present invention may be erected upon a supporting surface with the two parts of the base 12 in end to end relation and a reel 28 attached to the base 12 by its foot 32 entering beneath the plate 30. The standards 42 and 44 are resilient to the extent that they may be spread apart to free the plug elements 58 and 60 from the respective recesses 54 in the core 48 of the spool 46. The fishing line 76 may be unwound from the reel 28 and wound on any selected one of the reel spools 46, 64, or 74, in any compartment thereon as desired and the cover 84 may be used to enclose the entire assembled spools for protecting the fishing lines wound thereon. Notches 92 are provided in the perimeters of each of the reel spools for temporarily holding an end portion of each fishing line wound thereon in the conventional manner common to fishing line spools.

Preferably, the spools and base may be fabricated of plastic or other lightweight material and the support member 36 formed of a resilient sheet material such as plastic metal, or the like, as desired.

Although the invention has been described for use with a fishing line, it is to be understood it may also be employed with thread, yarn, wire, and the like.

What is claimed is:

1. A spool assembly comprising a first reel spool having a core and a flange extending about said core at each end, said core being provided with an axially-disposed recess at each end thereof, radially-arranged ribs bisecting said recess on each end of said spool and having their outer faces coplanar with the adjacent flange, a second reel spool circumposed about said first reel spool, said second spool having a core and a flange extending about said core at each end, there being an opening extending axially from one end to the other end of said second spool which comfortably receives and fits about the perimeter of the flanges of said first spool, the flanges of said first spool and the flanges of said second spool being coplanar and flush with each other, and means detachably securing said first and second spools together.

2. A spool assembly comprising a first reel spool having a core and a flange extending about said core at each end, said core being provided with an axially-disposed recess at each end thereof, radially-arranged ribs bisecting said recess on each end of said spool and having their outer faces coplanar with the adjacent flange, a second reel spool circumposed about said first reel spool, said second spool having a core and a flange extending axially from one end to the other end of said second spool which conformably receives and fits about the perimeter of the flanges of said first spool, the flanges of said first spool and the flanges of said second spool being coplanar and flush with each other, means detachably securing said first and second spools together, a third reel spool circumposed about said second reel spool, said third spool being provided with an opening which conformably receives and fits about the flanges of said second spool, and another means detachably securing said third spool to said second spool.

References Cited in the file of this patent
UNITED STATES PATENTS

| | | |
|---|---|---|
| 462,004 | Hahn | Oct. 27, 1891 |
| 1,926,836 | Corlett | Sept. 12, 1933 |
| 2,129,916 | Erickson | Sept. 13, 1938 |
| 2,458,898 | Di Addario | Jan. 11, 1949 |